(12) United States Patent
Yellin et al.

(10) Patent No.: US 11,397,555 B2
(45) Date of Patent: Jul. 26, 2022

(54) BACKGROUND PRE-LOADING AND REFRESHING OF APPLICATIONS WITH AUDIO INHIBITION

(71) Applicant: TENSERA NETWORKS LTD., Hod HaSharon (IL)

(72) Inventors: Daniel Yellin, Raanana (IL); Eilon Regev, Givatayim (IL); Shimon Moshavi, Beit Shemesh (IL)

(73) Assignee: TENSERA NETWORKS LTD., Hod Hasharon (IL)

( * ) Notice: Subject to any disclaimer, the term of this patent is extended or adjusted under 35 U.S.C. 154(b) by 0 days.

(21) Appl. No.: 16/632,397

(22) PCT Filed: Oct. 21, 2018

(86) PCT No.: PCT/IB2018/058180
§ 371 (c)(1),
(2) Date: Jan. 20, 2020

(87) PCT Pub. No.: WO2019/082042
PCT Pub. Date: May 2, 2019

(65) Prior Publication Data
US 2020/0257491 A1 Aug. 13, 2020

Related U.S. Application Data

(60) Provisional application No. 62/577,199, filed on Oct. 26, 2017.

(51) Int. Cl.
*G06F 3/0482* (2013.01)
*G06F 3/16* (2006.01)
(Continued)

(52) U.S. Cl.
CPC .............. *G06F 3/165* (2013.01); *G06F 9/445* (2013.01); *H04L 69/329* (2013.01); *H04M 1/72403* (2021.01)

(58) Field of Classification Search
CPC ........ G06F 8/65; G06F 3/04817; G06F 8/658; G06F 3/0482; G06F 3/04842;
(Continued)

(56) References Cited

U.S. PATENT DOCUMENTS

2008/0016185 A1* 1/2008 Herberger ........... H04L 65/4092
709/219
2009/0132636 A1* 5/2009 Natanzon ............... H04N 19/12
709/201

(Continued)

FOREIGN PATENT DOCUMENTS

CN 108595224 A 9/2018
CN 108628645 A 10/2018
(Continued)

OTHER PUBLICATIONS

YouTube™ auto Pause and Resume, Offered by: MeryDev,Version 0.1.1, 1 page, Feb. 19, 2017.
(Continued)

*Primary Examiner* — Rayeez R Chowdhury
(74) *Attorney, Agent, or Firm* — Kligler & Associates Patent Attorneys Ltd

(57) ABSTRACT

A user device (24) includes a display (56), audio circuitry (58) and a processor (44). The processor is configured to run an application that includes visual content and audio content, by: (i) before a user of the user device invokes the application, running the application in a background mode in which the visual content is not visible on the display, and inhibiting the audio content from being played by the audio circuitry, and (ii) after the user invokes the application, switching to run the application in a foreground mode in which the visual content is visible on the display, and permitting the audio content to be played by the audio circuitry.

31 Claims, 2 Drawing Sheets

(51) Int. Cl.
    *G06F 9/445*     (2018.01)
    *H04L 69/329*     (2022.01)
    *H04M 1/72403*     (2021.01)

(58) Field of Classification Search
    CPC .... G06F 3/0488; G06F 40/103; G06F 40/106;
                G06F 8/61; G06F 15/167; G06F 16/95;
                G06F 16/9574; G06F 1/26; G06F 3/1423;
                  G06F 7/78; G06F 8/60; G06F 8/71
    See application file for complete search history.

(56) References Cited

U.S. PATENT DOCUMENTS

| | | | |
|---|---|---|---|
| 2009/0138507 A1 | 5/2009 | Burckart et al. | |
| 2011/0182441 A1* | 7/2011 | Coffman | G06F 3/165 |
| | | | 381/107 |
| 2013/0089303 A1* | 4/2013 | Jiang | H04N 5/93 |
| | | | 386/285 |
| 2013/0301918 A1* | 11/2013 | Frenkel | G11B 27/036 |
| | | | 382/180 |
| 2014/0359442 A1* | 12/2014 | Lin | G06F 3/167 |
| | | | 715/716 |
| 2016/0021211 A1 | 1/2016 | Yellin et al. | |
| 2017/0293465 A1 | 10/2017 | Kotteri et al. | |
| 2019/0347107 A1 | 11/2019 | Ma et al. | |
| 2019/0347113 A1 | 11/2019 | Ma et al. | |
| 2019/0347128 A1 | 11/2019 | Han et al. | |
| 2019/0354384 A1 | 11/2019 | Huang | |
| 2019/0370021 A1* | 12/2019 | Chen | G06F 9/445 |
| 2019/0370022 A1 | 12/2019 | Han et al. | |
| 2019/0370095 A1 | 12/2019 | Chen et al. | |
| 2019/0370603 A1 | 12/2019 | Chen et al. | |
| 2019/0370657 A1 | 12/2019 | Chen et al. | |
| 2020/0304842 A1* | 9/2020 | Kumar | H04N 21/8456 |

FOREIGN PATENT DOCUMENTS

| | | |
|---|---|---|
| CN | 108647052 A | 10/2018 |
| JP | 2005092708 A | 4/2005 |
| WO | 2005043337 A1 | 5/2005 |
| WO | 2016010698 A1 | 1/2016 |
| WO | 2018055506 A1 | 3/2018 |

OTHER PUBLICATIONS

International Application # PCT/IB2018/058180 search report dated Jan. 8, 2019.

* cited by examiner

BACKGROUND PRE-LOADING AND REFRESHING OF APPLICATIONS WITH AUDIO INHIBITION

CROSS-REFERENCE TO RELATED APPLICATIONS

This application is U.S. National Phase of PCT Application PCT/IB2018/058180, which claims the benefit of U.S. Provisional Patent Application 62/577,199, filed Oct. 26, 2017. The disclosures of these related applications are incorporated herein by reference.

FIELD OF THE INVENTION

The present invention relates generally to communication system, and particularly to methods and systems for background pre-loading and refreshing of applications.

BACKGROUND OF THE INVENTION

Various techniques are known in the art for running applications ("apps") in user devices in a manner that improves user experience. For example, PCT International Publication WO 2018/055506, entitled "An optimized CDN for the wireless last mile," describes techniques that involve pre-loading an application installed in a user device, before a user requests to activate the application. Some disclosed techniques involve refreshing one or more applications that run in a background mode in the user device.

SUMMARY OF THE INVENTION

An embodiment of the present invention that is described herein provides a user device including a display, audio circuitry and a processor. The processor is configured to run an application that includes visual content and audio content, by: (i) before a user of the user device invokes the application, running the application in a background mode in which the visual content is not visible on the display, and inhibiting the audio content from being played by the audio circuitry, and (ii) after the user invokes the application, switching to run the application in a foreground mode in which the visual content is visible on the display, and permitting the audio content to be played by the audio circuitry.

In an embodiment, the processor is configured to inhibit the audio content by identifying and blocking an audio stream associated with the application. In another embodiment, the processor is configured to inhibit the audio content by muting the audio circuitry of the user device while the application is running in the background mode. In yet another embodiment, the processor is configured to inhibit the audio content by obtaining and running a silent version of at least part of the application, which launches the app in the background mode and does not play the audio content. The processor may be configured to obtain the silent version by executing a call-back function provided by the application.

In some embodiments, after the user invokes the application, the processor is configured to play the audio content that was inhibited while the application was running in the background mode. In an example embodiment, the processor is configured to play the audio content that was inhibited by obtaining and running a post-activation version of at least part of the application, which transitions the application from the background mode to the foreground mode and plays the audio content that was inhibited while the application was running in the background mode. In an embodiment, the processor is configured to obtain the post-activation version by executing a call-back function provided by the application.

In a disclosed embodiment, while the application is running in the background mode, the processor is configured to fetch over a communication network an updated version of at least part of the application, and do run the updated version in the background mode while inhibiting the audio content of the updated version. In another embodiment, the processor is configured to start running the application in the background mode only in response to verifying that the application is not already running in the user device.

In some embodiments, the processor is configured to provide an Application Programming Interface (API) for obtaining: (i) a silent version of at least part of the application, which launches the application in the background mode and does not play the audio content, and (ii) a post-activation version of at least part of the application, which transitions the application from the background mode to the foreground mode and plays the audio content that was inhibited while the application was running in the background mode.

In an embodiment, upon the user invoking the application or accessing in-app content associated with the application, the processor is configured to check whether the application has been pre-loaded, to run the post-activation version if the application has been pre-loaded, and to run a normal version of the application if the application has not been pre-loaded. In an embodiment, the processor is configured to run an Operating System (OS) that provides the API. In an alternative embodiment, the processor is configured to run a software component that pre-loads applications, and which also provides the API.

There is additionally provided, in accordance with an embodiment of the present invention, a method including, in a user device that includes a display and audio circuitry, running an application that comprises visual content and audio content, by: (i) before a user of the user device invokes the application, running the application in a background mode in which the visual content is not visible on the display, and inhibiting the audio content from being played by the audio circuitry, and (ii) after the user invokes the application, switching to run the application in a foreground mode in which the visual content is visible on the display, and permitting the audio content to be played by the audio circuitry.

There is further provided, in accordance with an embodiment of the present invention, a computer software product, the product including a tangible non-transitory computer-readable medium in which program instructions are stored, which instructions, when read by a processor in a user device that includes a display and audio circuitry, cause the processor to run an application that comprises visual content and audio content, by: (i) before a user of the user device invokes the application, running the application in a background mode in which the visual content is not visible on the display, and inhibiting the audio content from being played by the audio circuitry, and (ii) after the user invokes the application, switching to run the application in a foreground mode in which the visual content is visible on the display, and permitting the audio content to be played by the audio circuitry.

The present invention will be more fully understood from the following detailed description of the embodiments thereof, taken together with the drawings in which:

DETAILED DESCRIPTION OF EMBODIMENTS

Overview

Figure 1:
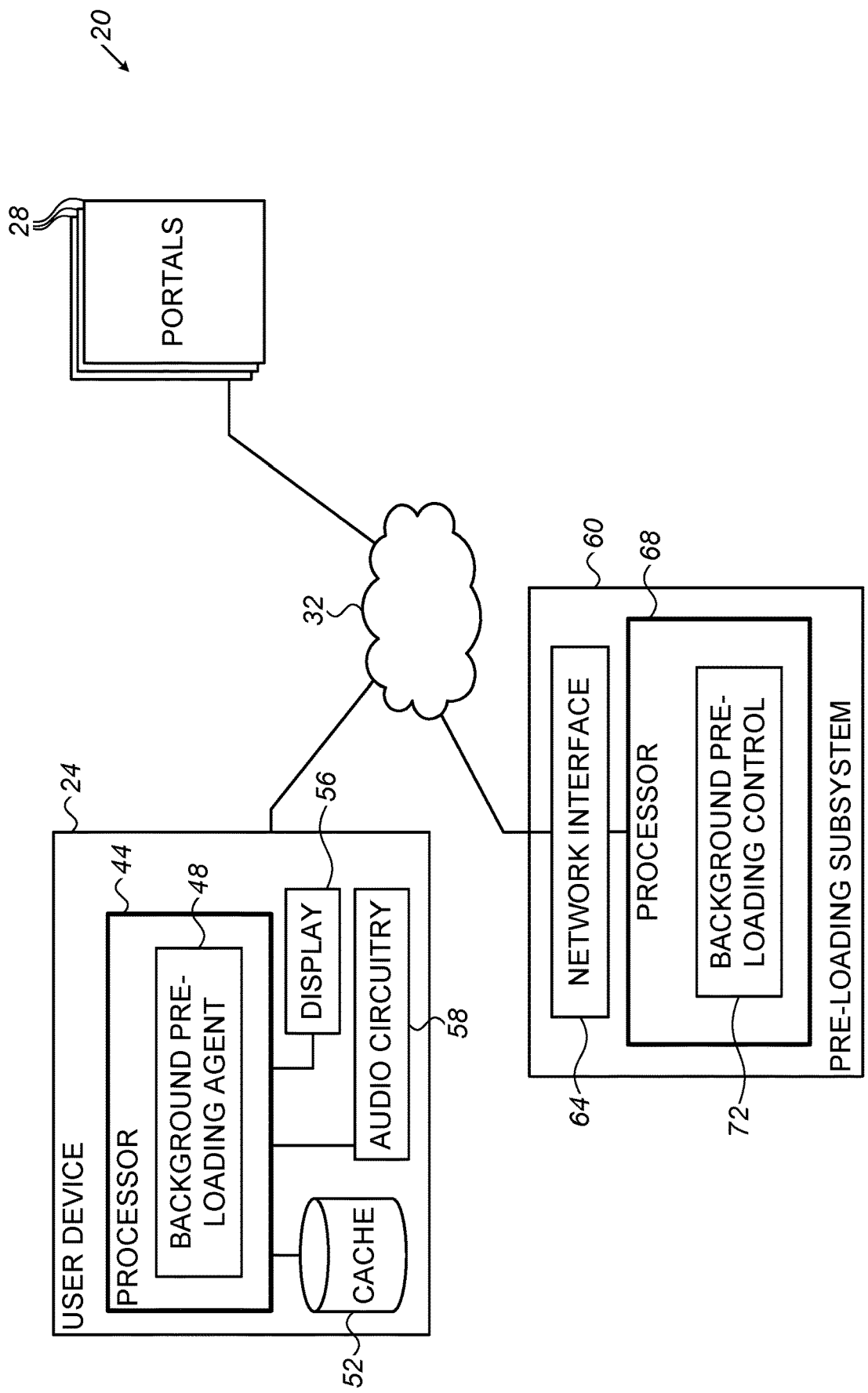
FIG. 1 is a block diagram that schematically illustrates a communication system that uses silent app pre-loading, in accordance with an embodiment of the present invention.

Embodiments of the present invention that are described herein provide improved methods and systems for running applications "apps" in user devices.

In some embodiments, a processor in a user device pre-loads and runs an app in a background mode, before the user invokes the app. In the background mode the visual content of the app is not displayed to the user. When the user invokes the app, the processor switches to run the app in a foreground mode that is visible to the user. The time needed for switching to the foreground mode is typically much shorter than the time needed for loading and running the app from scratch. As a result, the app starts almost immediately from the user's perspective, resulting in superior user experience. In the present context, the term "pre-loading an app" refers to pre-loading any app element such as executable code associated with the app, content associated with the app, app data associated with the app, and/or code or content that is reachable using the app by user actions such as clicks.

In many cases, the app comprises audio content in addition to the visual content. In particular, some audio content may begin playing automatically when the app is launched, regardless of any user action. Unless accounted for, such audio content might play undesirably when the application begins to run in the background mode.

In some embodiments of the present invention, as long as the app is running in the background mode, the processor inhibits the audio content of the app from being played by the audio circuitry of the user device. When switching to run the app in the foreground mode, the processor permits the audio content to be played. Several example implementations of inhibiting and enabling audio are described herein.

In some embodiments, while the app is running in the background mode, the processor obtains an updated version of at least part of the app over a communication network. This operation is referred to herein as "background refresh." During background refresh, too, the processor inhibits the audio content of the updated version from being played, and permits audio playing only upon switching to the foreground mode. In the present context, the term "an updated version of at least part of the app" refers to any app element such as executable code associated with the app, content associated with the app, app data associated with the app, and/or code or content that is reachable using the app by user actions such as clicks.

In an embodiment, upon switching to the foreground mode, the processor plays some or all of the audio content that was inhibited while the app was running in the background mode.

In one embodiment, the user device's Operating System (OS) supports an Application Programming Interface (API) that obtains one or more of the following versions of launch code for the app:

- A "normal" version: Code that launches the app, without prior pre-loading, into the foreground mode.
- A "silent" version: Code that pre-loads (including launching) the app in the background mode. In particular, the silent version does not play audio content that would normally be played upon launch.
- A "post-activation" version: Code that launches the app, which has previously been pre-loaded and runs in the background mode, into the foreground mode. In some embodiments the post-activation version plays the audio content that was skipped by the silent version.

When using the disclosed techniques, apps can be pre-loaded and refreshed in the background mode in a manner that is truly transparent to the user.

System Description

FIG. 1 is a block diagram that schematically illustrates a communication system 20 that uses silent application ("app") pre-loading, in accordance with an embodiment of the present invention.

System 20 comprises a user device 24, which runs one or more apps. Device 24 may comprise any suitable wireless or wireline device, such as, for example, a cellular phone or smartphone, a wireless-enabled laptop or tablet computer, a desktop personal computer, a smart TV, a wearable device, an automotive user device, or any other suitable type of user device that is capable of communicating over a network and presenting content to a user. The figure shows a single user device 24 for the sake of clarity. Real-life systems typically comprise a large number of user devices of various kinds.

In the present context, the term "app" refers to any suitable computer program that runs on the user device and may be invoked (activated) by the user. Some apps may be dedicated, special-purpose applications such as game apps. Other apps may be general-purpose applications such as Web browsers.

In some embodiments, although not necessarily, apps are provided by and/or communicate with one or more network-side servers, e.g., portals 28, over a network 32. Network 32 may comprise, for example a Wide Area Network (WAN) such as the Internet, a Local Area Network (LAN), a wireless network such as a cellular network or Wireless LAN (WLAN), or any other suitable network or combination of networks.

In the present example, user device 24 comprises a processor 44 that carries out the various processing tasks of the user device. Among other tasks, processor 44 runs a software component referred to as a pre-loading agent 48, which handles pre-loading of apps. In addition, user device 24 comprises a cache memory 52 for caching content associated with apps. Cache 52 is typically managed by agent 48.

User device 24 further comprises a display 56 for presenting visual content to the user, and audio circuitry 58 for playing audio content to the user. The audio circuitry may comprise, for example, an audio decoder, digital-to-analog conversion circuitry, audio amplification circuitry, and an audio output device such as a speaker or headset interface.

User device 24 typically also comprises a suitable network interface (not shown in the figure) for connecting to network 32. This network interface may be wired (e.g., an Ethernet Network Interface Controller—NIC) or wireless (e.g., a cellular modem or a Wi-Fi modem). Typically, user device 24 further comprises some internal memory, e.g., Random Access Memory (RAM)—not shown in the figure—that is used for storing relevant code and/or data.

In the example embodiment of FIG. 1, although not necessarily, system 20 further comprises a pre-loading subsystem 60 that performs pre-loading tasks on the network side. Subsystem 60 comprises a network interface 64 for communicating over network 32, and a processor 68 that carries out the various processing tasks of the pre-loading subsystem. In the present example, processor 68 runs a pre-loading control unit 72 that carries out network-side pre-loading tasks. Network-side pre-loading tasks may comprise, for example, deciding which apps to pre-load and when, choosing whether and which in-app content to pre-load, deciding how much of an app component to pre-load (e.g., only executing some initial executable code, or pre-rendering of the app's user interface), to name just a few examples.

In the embodiments described herein, for the sake of clarity, the pre-loading tasks are described as being carried out by processor 44 of user device 24. Generally, however, pre-loading tasks may be carried out by processor 44 of device 24, by processor 68 of subsystem 60, or both. Thus, any reference to "processor" below may refer, in various embodiments, to processor 44, processor 68, or both.

The configurations of system 20 and its various elements shown in FIG. 1 are example configurations, which are chosen purely for the sake of conceptual clarity. In alternative embodiments, any other suitable configurations can be used. For example, in some embodiments the pre-loading tasks may be implemented entirely in processor 44 of user device 24, in which case subsystem 60 may be eliminated altogether.

Pre-loading agent 48 may be implemented in a software module running on processor 44, in an application running on processor 44, in a Software Development Kit (SDK) embedded in an application running on processor 44, by the Operating System (OS) running on processor 44, or in any other suitable manner.

Although the embodiments described herein refer mainly to human users, the term "user" refers to machine users, as well. Machine users may comprise, for example, various host systems that use wireless communication, such as in various Internet-of-Things (IoT) applications.

The different elements of system 20 may be implemented using suitable software, using suitable hardware, e.g., using one or more Application-Specific Integrated Circuits (ASICs) or Field-Programmable Gate Arrays (FPGAs), or using a combination of hardware and software elements. Cache 52 may be implemented using one or more memory or storage devices of any suitable type. In some embodiments, agent 48 and/or subsystem 60 may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Pre-Loading and Background Refresh with Inhibition of Audio

Apps installed in user device 24 may present both visual content and audio content to the user. Visual content may comprise, for example, text, graphics, images and/or video. Audio content may comprise, for example, sound effects, speech, music and/or any other suitable audible content. Audio that is part of, or is associated with, video content is also regarded in the present context as audio content. When running an app, processor 44 typically displays visual content using display 56, and plays audio content using audio circuitry 58.

In particular, some audio content is played automatically upon launching the app or launching in-app content, without any action on the part of the user. This sort of audio content is referred to herein as "start-up audio," Start-up audio may comprise, for example, sound effects or music triggered by the launch of the app or by in-app content. Another kind of audio is a song triggered by an audio file available from the feed or other screen of the app that automatically begins playing when the app or in-app content is launched. Yet another example of start-up audio is audio associated with a video clip that is available from the feed or other screen of the app that automatically begins playing when the app or in-app content is launched.

When performing background pre-loading, it is important that the fact that an app is running in the background will be transparent to the user. Specifically, it is important that audio content of the app will not be played to the user. Thus, in some embodiments processor 44 inhibits the audio content of the app from being played by audio circuitry 58 as long as the app is running in the background mode. The embodiments described herein refer mainly to start-up audio, which would otherwise be played without requiring any user action. The disclosed techniques, however, are applicable to any other audio content.

Figure 2:
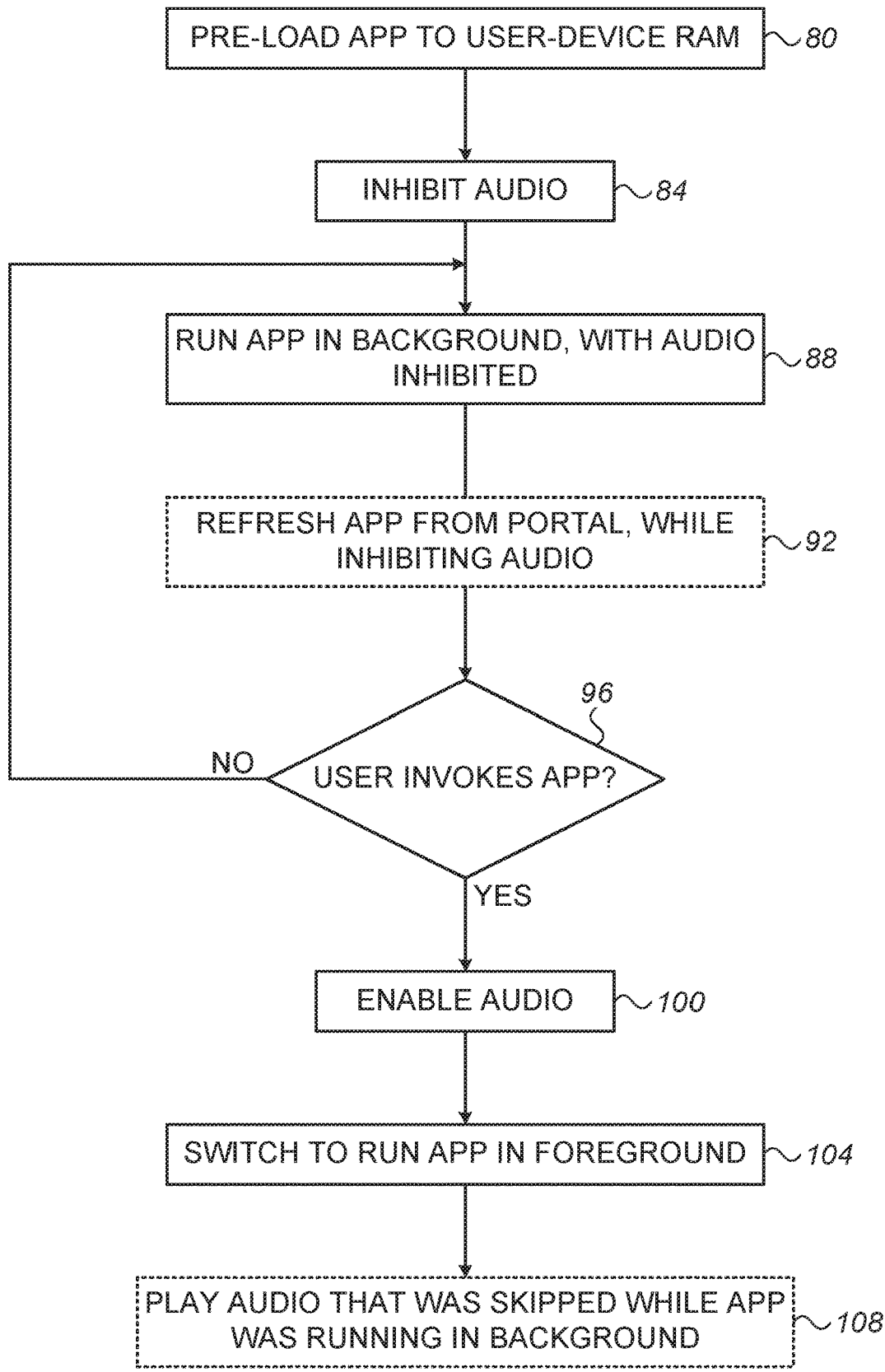
FIG. 2 is a flow chart that schematically illustrates a method for silent app pre-loading, in accordance with an embodiment of the present invention.

FIG. 2 is a flow chart that schematically illustrates a method for silent app pre-loading, in accordance with an embodiment of the present invention. The method is typically carried out by processor 44 of user device 24.

The method of FIG. 2 begins with pre-loading agent 48 pre-loading a certain app, at a pre-loading step 80. Pre-loading is triggered by agent 48 and/or by subsystem 60, not by the user of user device 24. Any suitable criterion can be used to decide which app or apps to pre-load, and when. The criterion may depend, for example, on the usage pattern of the user or any other factor.

In some embodiments, before pre-loading the app, agent 48 verifies that the app is not already running (either in the background or in the foreground). Agent 48 pre-loads the app only if the app is not already running in the user device.

Typically, agent 48 pre-loads the app's feed (the part of the app that is normally invoked when the user clicks on the app). Agent 48 may also pre-load in-app content that is normally presented when the user clicks on a link available in the app.

At an audio inhibiting step 84, agent 48 inhibits some or all of the audio content of the pre-loaded app from being played by audio circuitry 58. Agent 48 may use various techniques for inhibiting the audio. In one example embodiment, agent 48 intercepts and blocks an audio stream associated with the app from being played.

For example, the software component of the OS that handles audio (e.g., AudioFlinger in Android) can identify that the audio stream to be played is associated with a pre-loaded app, and in response refrain from passing the audio to the kernel drivers running the audio circuitry.

As another example, agent 48 may temporarily mute all audio output of user device 24. Muting may be carried out, for example, by disabling some or all of audio circuitry 58, or by blocking audio signals from reaching audio circuitry 58.

In another embodiment, the app provider provides a "silent" version of at least part of the app, e.g. of the app's launch code. The silent version deliberately does not include the start-up audio. In this embodiment, when pre-loading the app, agent 48 pre-loads the silent version, e.g., by executing a call-back function provided by the app, for example via a suitable Application Programming Interface (API). In alternative embodiments, agent 48 may use any other suitable technique for inhibiting the audio content of the pre-loaded app.

At a background running step 88, processor 44 runs the pre-loaded app in a background mode that is transparent to the user. In particular, the audio content of the app is inhibited and is not played by audio circuitry 58.

At an (optional) refreshing step 92, pre-loading agent 48 performs a background refresh of the app using the corresponding portal 28. The purpose of the background refresh is to ensure that the app running in the background mode is up-to-date, so that once the user invokes it, the up-to-date version will start running in the foreground.

Typically, at step 92 agent 48 obtains an updated version of at least part of the app from portal 28 over network 32, if such a version exists. Since the updated version still runs in the background mode, the processor inhibits the audio content of the updated version from being played by audio circuitry 58. As noted above, background refresh may be applied to any element of the app, e.g., executable code associated with the app, content associated with the app, app data associated with the app, and/or code or content that is reachable using the app by user actions such as clicks.

In an embodiment, agent 48 tracks at least some of the content associated with the pre-loaded app on portal 28, and/or the user-interface of the app. If any of these elements has changed relative to the version that is currently running in the background mode, agent 48 fetches and runs (in the background) an updated version from portal 28. The update may comprise update to the content and/or to the user interface running in the background.

At an invocation checking step 96, agent 48 checks whether the user has invoked the app. If not, the method loops back to step 88 above.

In response to detecting that the user has invoked the app, agent 48 enables the audio content associated with the app to be played by audio circuitry 58. At a mode switching step 100, agent 48 switches to run the app in the foreground mode.

In an (optional) audio completion step 108, agent 48 plays at least some of the audio content that was skipped while the app was running in the background mode (typically start-up audio). The audio being played at this stage may comprise audio associated with the original app pre-loaded at step 80, and/or audio associated with an updated version obtained via background refresh at step 92.

In one example embodiment, the app provider provides a "post-activation" version of at least part of the app, e.g. of the app's launch code. Among other tasks, the post-activation version plays the audio content that was skipped in the background mode. In this embodiment, agent 48 may obtain the post-activation version, by executing a call-back function provided by the app, for example via a suitable API. Agent 48 begins to run the post-activation version in response to the user invoking the app, i.e., upon switching to run the app in the foreground.

The API for obtaining the normal, silent and post-activation versions may be provided, for example, by the OS of user device 24, or by pre-load agent 48.

In an embodiment, upon the user invoking the app or accessing in-app content associated with the app, agent 48 (or other software running in processor 44) checks whether the app has been pre-loaded or not (i.e., whether the app is currently running in the background or not). If pre-loaded, the processor runs the post-activation version. If not pre-loaded, the processor runs the normal version.

The method flow of FIG. 2 is an example flow that is depicted purely for the sake of conceptual clarity. In alternative embodiments, any other suitable flow can be used.

Additional Examples and Variations

The techniques disclosed herein can be used in a variety of use cases and scenarios. Consider, for example, a gaming app whose launch code triggers certain sound effects. When the app is pre-loaded, agent 48 inhibits these sounds effects. In some embodiments, when the user later clicks on the app, agent 48 triggers the sound effects that were previously skipped. In this manner, the audio experience of the app launch will not be altered by the pre-loading operation.

As another example, consider an app whose feed obtains from portal 28, upon launch, a video clip in the visible portion of the screen that automatically begins playing when the app is launched. In some embodiments, when the app is pre-loaded and running in the background, processor 44 (or processor 68 in subsystem 60 on the network side) may identify this video clip and prefetch it to cache 52 of device 24. Processor 44 can then add the video clip, in the background, to the user interface of the pre-loaded app (e.g., to the background render or pre-render of the app). In an embodiment, agent 48 inhibits the audio of the video clip while the app runs in the background. When the user invokes the app, agent 48 triggers the audio and permits it to play.

In some embodiments, the agent 48 is implemented as a software component of the OS of user device 24. In an example embodiment, the OS provides an API using which the app can provide inputs, possibly including callback functions that enable the above-described initial pre-load, background refresh and post-activation operations. Due to the disclosed techniques, all these operations are transparent to the user with respect to the audio experience.

As noted above, although the embodiments described herein refer mainly to pre-loading of an app, the disclosed techniques can be used in a similar manner for pre-loading any suitable subset of one or more app components. For example, if an app has a displayed feed that offers access to additional screens or components (e.g., via displayed links), then one or more of these additional screens or components can be pre-loaded in the background. In this manner, if and when the user actually accesses the screens or components in question, response time will be fast. Such screens or components may comprise, for example, an in-app article or video referenced by the app.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A user device, comprising:
   a display;
   audio circuitry; and
   a processor, configured to run an application that comprises visual content and audio content, by:
      before a user of the user device invokes the application, (i) running the application in a background mode in which the visual content is not displayed on the display, and (ii) skipping start-up audio, which is normally played by the user application upon launch without requiring any user action, by inhibiting the start-up audio from being played by the audio circuitry; and
      after the user invokes the application, (i) switching to run the application in a foreground mode in which the visual content is displayed on the display, (ii) completing playing of the start-up audio that is normally played upon launch without requiring any user action but was skipped and deferred until after the user invokes the application because the application was running in the background mode, and (iii) permitting subsequent audio content to be played by the audio circuitry.

2. The user device according to claim 1, wherein the processor is configured to inhibit the start-up audio by identifying and blocking an audio stream associated with the application.

3. The user device according to claim 1, wherein the processor is configured to inhibit the start-up audio by muting the audio circuitry of the user device while the application is running in the background mode.

4. The user device according to claim 1, wherein the processor is configured to inhibit the start-up audio by obtaining and running a silent version of at least part of the application, which launches the app in the background mode and does not play the start-up audio.

5. The user device according to claim 4, wherein the processor is configured to obtain the silent version via an Application Programming Interface (API) provided to the application.

6. The user device according to claim 1, wherein the processor is configured to play the start-up audio that was skipped, by obtaining and running a post-activation version of at least part of the application, which transitions the application from the background mode to the foreground mode and plays the start-up audio that was skipped while the application was running in the background mode.

7. The user device according to claim 6, wherein the processor is configured to obtain the post-activation version via an Application Programming Interface (API) provided to the application.

8. The user device according to claim 1, wherein, while the application is running in the background mode, the processor is configured to fetch over a communication network an updated version of at least part of the application, and do run the updated version in the background mode while inhibiting the audio content of the updated version.

9. The user device according to claim 1, wherein the processor is configured to start running the application in the background mode only in response to verifying that the application is not already running in the user device.

10. The user device according to claim 1, wherein the processor is configured to provide an Application Programming Interface (API) for obtaining:
    a silent version of at least part of the application, which launches the application in the background mode and does not play the start-up audio; and
    a post-activation version of at least part of the application, which transitions the application from the background mode to the foreground mode and plays the start-up audio that was skipped while the application was running in the background mode.

11. The user device according to claim 10, wherein, upon the user invoking the application or accessing in-app content associated with the application, the processor is configured to:
    check whether the application has been pre-loaded;
    if the application has been pre-loaded, run the post-activation version; and
    run a normal version of the application if the application has not been pre-loaded.

12. The user device according to claim 10, wherein the processor is configured to run an Operating System (OS) that provides the API.

13. The user device according to claim 10, wherein the processor is configured to run a software component that pre-loads applications, and which also provides the API.

14. A method, comprising:
    in a user device that includes a display and audio circuitry, running an application that comprises visual content and audio content, by:
       before a user of the user device invokes the application, (i) running the application in a background mode in which the visual content is not displayed on the display, and (ii) skipping start-up audio, which is normally played by the user application upon launch without requiring any user action, by inhibiting the start-up audio from being played by the audio circuitry; and
       after the user invokes the application, (i) switching to run the application in a foreground mode in which the visual content is displayed on the display, (ii) completing playing of the start-up audio that is normally played upon launch without requiring any user action but was skipped and deferred until after the user invokes the application because the application was running in the background mode, and (iii) permitting subsequent audio content to be played by the audio circuitry.

15. The method according to claim 14, wherein the processor is configured to inhibit the start-up audio by identifying and blocking an audio stream associated with the application.

16. The method according to claim 14, wherein the processor is configured to inhibit the start-up audio by muting the audio circuitry of the user device while the application is running in the background mode.

17. The method according to claim 14, wherein the processor is configured to inhibit the start-up audio by obtaining and running a silent version of at least part of the application, which launches the app in the background mode and does not play the start-up audio.

18. The method according to claim 17, wherein the processor is configured to obtain the silent version via an Application Programming Interface (API) provided to the application.

19. The method according to claim 14, wherein the processor is configured to play the start-up audio that was skipped, by obtaining and running a post-activation version of at least part of the application, which transitions the application from the background mode to the foreground mode and plays the start-up audio that was skipped while the application was running in the background mode.

20. The method according to claim 19, wherein the processor is configured to obtain the post-activation version via an Application Programming Interface (API) provided to the application.

21. The user device according to claim 14, wherein, while the application is running in the background mode, the processor is configured to fetch over a communication network an updated version of at least part of the application, and do run the updated version in the background mode while inhibiting the audio content of the updated version.

22. The user device according to claim 14, wherein the processor is configured to start running the application in the background mode only in response to verifying that the application is not already running in the user device.

23. The user device according to claim 14, wherein the processor is configured to provide an Application Programming Interface (API) for obtaining:
  a silent version of at least part of the application, which launches the application in the background mode and does not play the start-up audio; and
  a post-activation version of at least part of the application, which transitions the application from the background mode to the foreground mode and plays the start-up audio that was skipped while the application was running in the background mode.

24. The method according to claim 23, wherein, upon the user invoking the application or accessing in-app content associated with the application, the processor is configured to:
  check whether the application has been pre-loaded;
  if the application has been pre-loaded, run the post-activation version; and
  run a normal version of the application if the application has not been pre-loaded.

25. The method according to claim 23, wherein the processor is configured to run an Operating System (OS) that provides the API.

26. The method according to claim 23, wherein the processor is configured to run a software component that pre-loads applications, and which also provides the API.

27. A computer software product, the product comprising a tangible non-transitory computer-readable medium in which program instructions are stored, which instructions, when read by a processor in a user device that includes a display and audio circuitry, cause the processor to run an application that comprises visual content and audio content, by:

before a user of the user device invokes the application,
  (i) running the application in a background mode in which the visual content is not displayed on the display, and (ii) skipping start-up audio, which is normally played by the user application upon launch without requiring any user action, by inhibiting the start-up audio from being played by the audio circuitry; and
after the user invokes the application, (i) switching to run the application in a foreground mode in which the visual content is displayed on the display, (ii) completing playing of the start-up audio that is normally played upon launch without requiring any user action but was skipped and deferred until after the user invokes the application because the application was running in the background mode, and (iii) permitting subsequent audio content to be played by the audio circuitry.

28. The user device according to claim 1, wherein the application is a gaming application having launch code that triggers sound effects, and wherein the processor is configured to skip the sound effects when running the gaming application in the background mode, and to complete the skipped sound effects upon switching to run the gaming application in the foreground mode.

29. The user device according to claim 1, wherein the application has a feed that automatically plays a video clip upon launch, and wherein the processor is configured to skip audio of the video clip when running the application in the background mode, and to complete the skipped audio of the video clip upon switching to run the application in the foreground mode.

30. The method according to claim 14, wherein the application is a gaming application having launch code that triggers sound effects, wherein skipping the start-up audio comprises skipping the sound effects when running the gaming application in the background mode, and wherein completing playing of the start-up audio comprises completing the skipped sound effects upon switching to run the gaming application in the foreground mode.

31. The method according to claim 14, wherein the application has a feed that automatically plays a video clip upon launch, wherein skipping the start-up audio comprises skipping audio of the video clip when running the application in the background mode, and wherein completing playing of the start-up audio comprises completing the skipped audio of the video clip upon switching to run the application in the foreground mode.

* * * * *